United States Patent
Wang

(10) Patent No.: US 6,817,582 B2
(45) Date of Patent: Nov. 16, 2004

(54) PNEUMATIC EXTENSIBLE ANCHORING RACK

(76) Inventor: Ting-Tsai Wang, No. 9, Alley 3, Lane 195, Sec. 1, Kang Ning Rd., Nei Hu District, Taipei City (TW)

( * ) Notice: Subject to any disclaimer, the term of this patent is extended or adjusted under 35 U.S.C. 154(b) by 167 days.

(21) Appl. No.: 10/117,140

(22) Filed: Apr. 8, 2002

(65) Prior Publication Data

US 2003/0189157 A1 Oct. 9, 2003

(51) Int. Cl.[7] ............................................. F16M 11/26
(52) U.S. Cl. ...................... 248/188.5; 248/631; 267/201
(58) Field of Search ................................ 267/201, 205, 267/34, 64.13; 248/188.5, 631, 414

(56) References Cited

U.S. PATENT DOCUMENTS

| | | | | |
|---|---|---|---|---|
| 2,563,040 A | * | 8/1951 | Junkunc | 403/365 |
| 3,737,136 A | * | 6/1973 | Snurr | 248/412 |
| 3,853,297 A | * | 12/1974 | Drolet | 248/412 |
| 4,121,799 A | * | 10/1978 | Michio | 248/171 |
| 4,627,591 A | * | 12/1986 | Heckmann | 248/411 |
| 4,640,484 A | * | 2/1987 | Lamond et al. | 248/407 |
| 5,031,869 A | * | 7/1991 | Strater et al. | 248/406.1 |
| 5,492,430 A | * | 2/1996 | Jones | 403/109.5 |
| 5,598,788 A | * | 2/1997 | Jonker | 108/147 |
| 6,050,531 A | * | 4/2000 | Wilcox | 248/188.5 |
| 6,601,454 B1 | * | 8/2003 | Botnan | 73/756 |

* cited by examiner

Primary Examiner—Korie Chan
(74) Attorney, Agent, or Firm—Rosenberg, Klein & Lee

(57) ABSTRACT

A pneumatic extensible anchoring rack consists of an outer tube, an inner tube, a lid and an air cylinder. The outer tube is a hollow tubular member. The lid is located above the outer tube. The air cylinder is an extensible tubular member located in a hollow space formed between the outer tube and the inner tube, and has one end fastening to the lid through a pin. The inner tube is a hollow tubular member located in the outer tube and is fastened to another end of the air cylinder through a pin. The air cylinder is extensible to control the extension or retraction of the outer tube and inner tube of a landing gear. As the pneumatic power is not sufficient to support the weight to be lifted, an anchoring means is provided for anchoring. The anchoring means includes four brake shoes located on four corners in the interior of the inner tube, four supporting rods located in the hollow space between the outer tube and the inner tube and fastened to the lid through pins, a pulling bar and a control valve. The control valve is mounted to the lid and has an air inlet and a leather bowl, a spring and an anchoring dock. The pulling bar has a lower end fastening to two sliding blocks and an upper end running through the outer tube and fastening to the anchoring dock of the control valve.

8 Claims, 3 Drawing Sheets

PNEUMATIC EXTENSIBLE ANCHORING RACK

BACKGROUND OF THE INVENTION

1. Field of the Invention

The present invention relates to a pneumatic extensible anchoring rack and particularly to an extensible rack that has an air cylinder to connect an outer tube and an inner tube to receive and discharge air to extend or retract the rack and provides a secured anchoring between the inner tube and the outer tube when the landing gear is lowered.

2. Description of the Prior Art

Conventional extensible anchoring racks mostly are being operated manually. Manual operation of the extensible racks is difficult, and operators have to go to the site where the landing gear is located to perform operations. Operators usually have to turn a crank to lift or lower the inner tube of the landing gear. It is time-consuming and not convenient, and takes a lot of labor and efforts.

The problems incurred to conventional extensible racks set forth above have troubled users for a long time. How to provide a novel and improved extensible rack that can save people's time and efforts, and facilitate user operation is a widely shared concern in the industry.

SUMMARY OF THE INVENTION

The primary object of the present invention is to resolve aforesaid disadvantages. The invention provides a pneumatic extensible anchoring rack that has an air cylinder to receive and discharge pumping air to lift or lower a landing gear so that operators can easily and conveniently operate with less time and efforts.

Another object of the present invention is to provide a pneumatic extensible anchoring rack that has an anchoring means for anchoring the inner tube and the outer tube when the landing gear is lowered so that the landing gear has sufficient strength to support the weight of the object being lifted.

The foregoing, as well as additional objects, features and advantages of the present invention will be more readily apparent from the following detailed description, which proceeds with reference to the accompanying drawings.

DESCRIPTION OF THE PREFERRED EMBODIMENT

Figure 1:
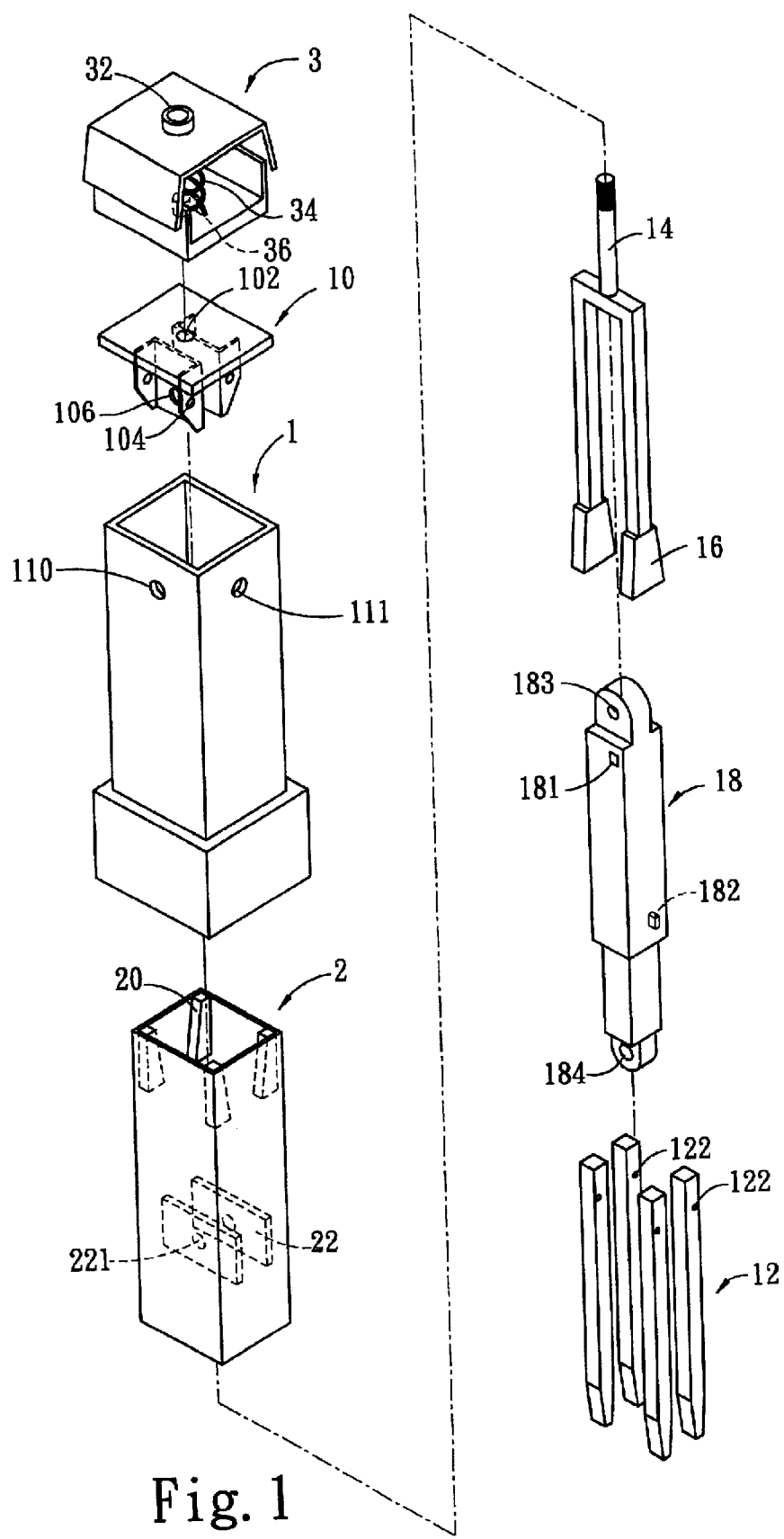
FIG. 1 is an exploded view of an embodiment of the present invention.
Figure 2:
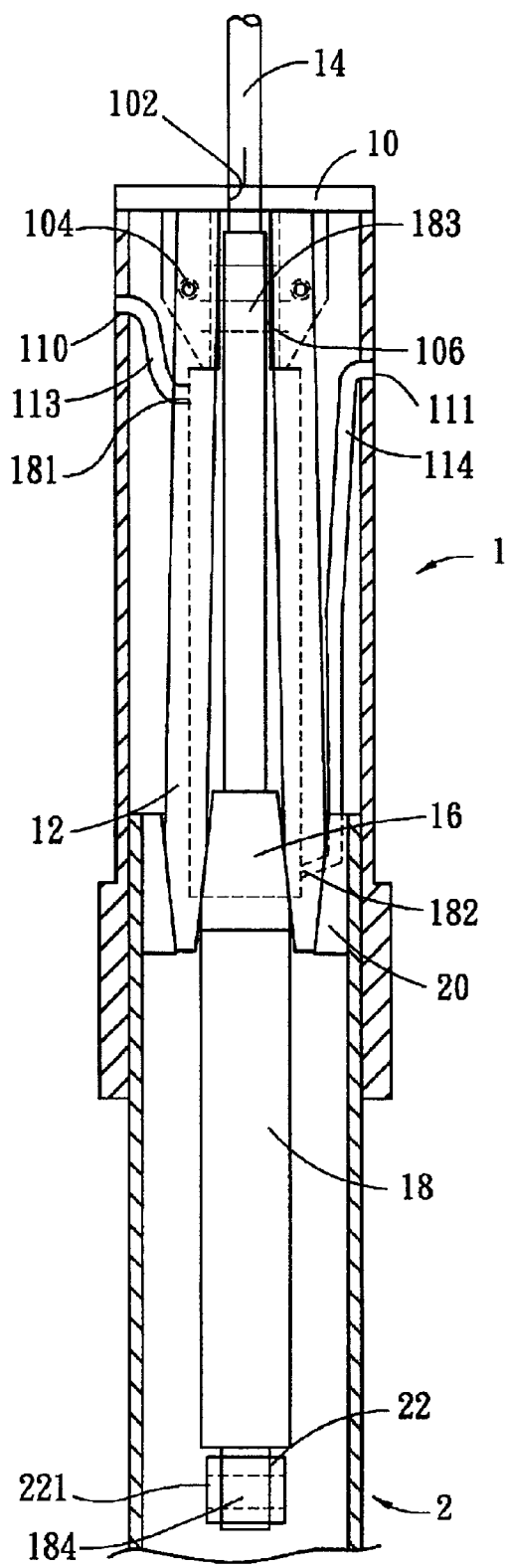
FIG. 2 is fragmentary sectional view of an embodiment of an outer tube and an inner tube of the present invention.

Refer to FIGS. 1 and 2 for an embodiment of the invention. The extensible anchoring rack according to the invention includes a hollow inner tube 2 housed in a hollow outer tube 1. The outer tube 1 has a top end coupling with a lid 10. The lid 10 has an opening 102. There is a control valve 3 located above the lid 10. The control valve 3 has an aperture 36 located on a lower section matching the opening 102 of the lid 10. Inside the inner tube 2, there is an air cylinder 18. The air cylinder 18 has a top end which has a first pin hole 183 formed thereon. The lid 10 has a second pin hole 106 engageable with the first pin hole 183 through a pin (not shown in the drawings). On interior four corners of the inner tube 2, there are four brake shoes 20. On an interior lower section of the inner tube 2, there are two anchoring plates 22 which have respectively a third pin hole 221 for engaging with a fourth pin hole 184 located on a lower end of the air cylinder 18 through a pin (not shown in the drawings). There are four supporting rods 12 located in an interior hollow space formed between the outer tube 1 and the inner tube 2. Each supporting rod 12 has a fifth pin hole 122 located on an upper end thereof to engage with a sixth pin hole 104 formed on the lid 10 through a pin (not shown in the drawings). There is a pulling bar 14 located in the interior hollow space between the outer tube 1 and the inner tube 2. The pulling bar 14 has a lower end fastening to two sliding blocks 16, and an upper end running through the opening 102 of the lid 10 and the aperture 36 of the control valve 3, and is fixedly fastened to the control valve 3.

The outer tube 1 has a third air inlet 110 and a fourth air inlet 111 which connect respectively with a first air inlet 181 and a second air inlet 182 formed on the air cylinder 18 through a first air duct 113 and a second air duct 114. Air may enter into the outer tube 1 through the third air inlet 110, and flows through the first air duct 113 to the first air inlet 181 of the air cylinder 18 to extend the air cylinder 18 downwards, and drives the inner tube 2 downwards. When the inner tube 2 is lowered, air enters into the control valve 3 through a fifth air inlet 32 formed on the control valve 3 to move the pulling bar 14 upwards. As a result, the two sliding blocks 16 are driven to slide upwards also, and the four supporting rods 12 are driven by the sliding blocks 16 to extend outwards. The extended four supporting rods 12 press against the brake shoes 20 of the lowering inner tube 2 to allow the outer tube 1 and the inner tube 2 to form a secured anchoring. When air enters through the fourth air inlet 111 of the outer tube 1 and flows through the second air duct 114 to the second air inlet 182 of the air cylinder 18, the air cylinder 18 is moved upwards and retracted, and drives the inner tube 2 upwards. And air enters into the control valve 3 through the fifth air inlet 32 to move the pulling bar 14 downwards. The two sliding blocks 16 also are slid downwards and the four supporting rods 12 are driven to retract inwards without pressing the brake shoes 20 such that the inner tube 2 may be withdrawn and housed inside the outer tube 1.

Figure 3:
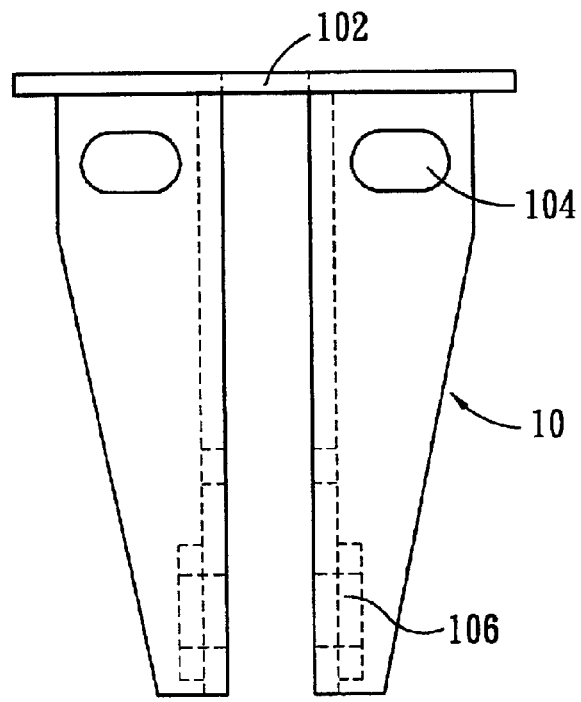
FIG. 3 is a schematic side view of an embodiment of a lid of the present invention.

Refer to FIG. 3 for an embodiment of the lid of the invention. The sixth pin holes 104 on the lid 10 are engageable with the fifth pin holes 122 on the supporting rods 12, the second pin hole 106 is engageable with the first pin hole 183 on the upper end of the air cylinder 18, and the upper end of the pulling bar 14 runs through the opening 102 of the lid 10.

Figure 4:
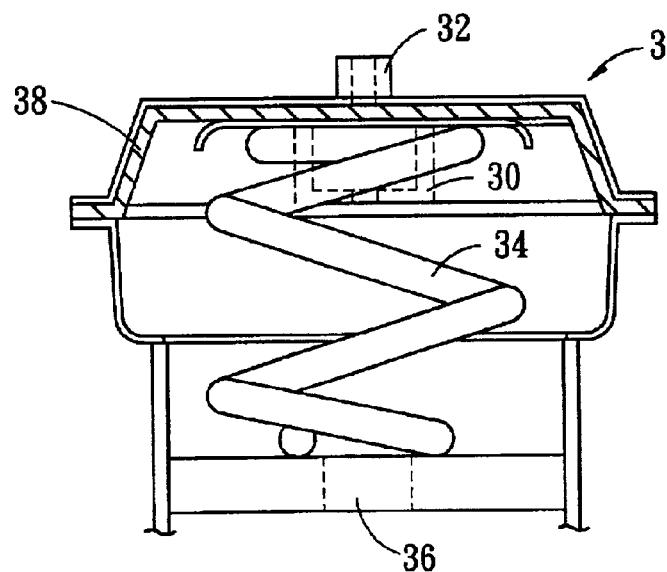
FIG. 4 is a schematic sectional view of an embodiment of a control valve of the present invention.

Refer to FIG. 4 for an embodiment of the control valve 3 of the invention. The control valve 3 has a fifth air inlet 32 formed on the top end and a leather bowl 38 located therein. There are an anchoring dock 30 and a spring 34 located below the leather bowl 38, and an aperture 36 under the leather bowl 38 communicating with the opening 102 of the lid 10. The upper end of the pulling bar 14 runs through the aperture 36 and fixedly fastened to the anchoring dock 30. When the inner tube 2 of the landing gear is lifted, air enters through the fifth air inlet 32 into the leather bowl 38, and the leather bowl 38 is expanded to compress the spring 34, and the anchoring dock 30 is lowered. As a result, the pulling bar 14 is moved downwards, and the two sliding blocks 16 at the bottom end of the pulling bar 14 also are moved downwards. When the inner tube 2 of the landing gear is lowered, air in the leather bowl 38 is discharged through the fifth air inlet 32, and the leather bowl 38 is retracted. The extension force of the spring 34 pushes the anchoring dock 30 upwards. As a result, the pulling bar 14 is also moved upwards, and the two sliding blocks 16 at the bottom end of the pulling bar 14 also are moved upwards.

By means of the construction set forth above, the pneumatic extensible anchoring rack of the invention has an extensible air cylinder connecting to an outer tube and an inner tube to receive or discharge air to drive the outer tube and the inner tube extending or retracting. The anchoring means provides a secured anchoring for the outer tube and the inner tube when the landing gear is lowered. All this provides more convenient operation to users.

While the preferred embodiment of the present invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the present invention.

What is claimed is:

1. A pneumatic extensible anchoring rack, comprising:
   a hollow outer tube;
   a lid located on an upper end of the outer tube;
   an air cylinder being an extensible tubular member having one end fastening to the lid through a first pin; and
   a hollow inner tube located in the outer tube fastening to another end of the
   air cylinder through a second pin.

2. The pneumatic extensible anchoring rack of claim 1, wherein the air cylinder has a first air inlet and a second air inlet formed thereon.

3. The pneumatic extensible anchoring rack of claim 2, wherein the outer tube has two sides having respectively a third air inlet and a fourth air inlet formed thereon connecting to the first air inlet and the second air inlet of the air cylinder through a first air duct and a second air duct for delivering air to the air cylinder.

4. The pneumatic extensible anchoring rack of claim 1, wherein the lid has an opening formed thereon.

5. The pneumatic extensible anchoring rack of claim 4 further having a control valve located above the lid, the control valve having an air inlet formed on a top end thereof and a leather bowl located therein communicating with the air inlet, the leather bowl having an anchoring dock and a spring located thereunder, and an aperture formed on a bottom end thereof matching the opening of the lid.

6. The pneumatic extensible anchoring rack of claim 5 further having a pulling bar located in a hollow space formed between the outer tube and the inner tube, the pulling bar having a plurality of sliding blocks fastened to a lower end thereof and an upper end running through the opening of the lid and the aperture of the control valve to fasten to the anchoring dock of the control valve.

7. The pneumatic extensible anchoring rack of claim 1, wherein the inner tube has a plurality of brake shoes located on the interior thereof.

8. The pneumatic extensible anchoring rack of claim 1 further having a plurality of supporting rods located in a hollow space formed between the outer tube and the inner tube, the supporting rods being fastened to the lid through third pins.

\* \* \* \* \*